United States Patent [19]

Migdal et al.

[11] Patent Number: 4,973,412

[45] Date of Patent: Nov. 27, 1990

[54] MULTIFUNCTIONAL LUBRICANT ADDITIVE WITH VITON SEAL CAPABILITY

[75] Inventors: Cyril A. Migdal, Croton-on-Hudson; Theodore E. Nalesnik, Wappingers Falls, both of N.Y.

[73] Assignee: Texaco Inc., White Plains, N.Y.

[21] Appl. No.: 519,970

[22] Filed: May 7, 1990

[51] Int. Cl.$^5$ ............... C10M 133/16; C10M 133/56
[52] U.S. Cl. ................ 252/49.6; 252/51.54; 252/400.4; 252/403
[58] Field of Search .............. 252/49.6, 51.5 A; 548/546, 547

[56] References Cited

U.S. PATENT DOCUMENTS

| | | | |
|---|---|---|---|
| 4,636,322 | 1/1987 | Nalesnik | 252/51.5 A |
| 4,663,064 | 5/1987 | Nalesnik et al. | 252/51.5 A |
| 4,699,724 | 10/1987 | Nalesnik et al. | 252/51.5 A |
| 4,713,189 | 12/1987 | Nalesnik et al. | 252/51.5 A |
| 4,713,191 | 12/1987 | Nalesnik | 252/51.5 A |

*Primary Examiner*—Olik Chaudhuri
*Assistant Examiner*—Ellen McAvoy
*Attorney, Agent, or Firm*—Robert A. Kulason; James J. O'Loughlin; Vincent A. Mallare

[57] ABSTRACT

A lubricating oil composition having improved antioxidancy, dispersancy and Viton seal compatibility. The antioxidant-dispersant being prepared by coupling partially acylated succinimides with an organic diacid, followed by further treatment with an unsaturated fatty acid, and then reaction of the nitroso group of an antioxidant aromatic amine with the unsaturated fatty acid to provide the lubricant product.

31 Claims, No Drawings

MULTIFUNCTIONAL LUBRICANT ADDITIVE WITH VITON SEAL CAPABILITY

BACKGROUND OF THE INVENTION

This invention relates to polymeric compositions suitable for use as antioxidant dispersants for lubricating oil and/or additives for fuels for internal combustion engines, particularly compositions which are compatible with synthetic rubbers and other polymeric materials utilized in seals and the like within internal combustion engines.

Internal combustion engines operate under a wide range of temperatures including low temperature stop-and-go service as well as high temperature conditions produced by continuous high speed driving. Stop-and-go driving, particularly during cold, damp weather conditions, leads to the formation of a sludge in the crankcase and in the oil passages of a gasoline or a diesel engine. This sludge seriously limits the ability of the crankcase oil to effectively lubricate the engine. In addition, the sludge with its entrapped water tends to contribute to rust formation in the engine. These problems tend to be aggravated by the manufacturer's lubrication service recommendations which specify extended oil drain intervals.

It is known to employ nitrogen containing dispersants and/or detergents in the formulation of crankcase lubricating oil compositions. Many of the known dispersant/detergent compounds are based on the reaction of an alkenylsuccinic acid or anhydride with an amine or polyamine to produce an alkenylsuccinimide or an alkenylsuccinamic acid as determined by selected conditions of reaction.

It is also known to chlorinate alkenylsuccinic acid or anhydride prior to the reaction with an amine or polyamine in order to produce a reaction product in which a portion of the amine or polyamine is attached directly to the alkenyl radical of the alkenylsuccinic acid or anhydride. The thrust of many of these processes is to produce a product having a relatively high level of nitrogen in order to provide improved dispersancy in a crankcase lubricating oil composition.

With the introduction of four cylinder internal combustion engines which must operate at relatively higher engine speeds or RPM's than conventional 6 and 8-cylinder engines in order to produce the required torque output, it has become increasingly difficult to provide a satisfactory dispersant lubricating oil composition.

Another problem facing the lubricant manufacturer is that of seal deterioration in the engine. All internal combustion engines use elastomer seals, such as Viton ® seals, in their assembly. Over time, these seals are susceptible to serious deterioration caused by the lubricating oil composition. A lubricating oil composition that degrades the elastomer seals in an engine is unacceptable to engine manufacturers and has limited value.

An important property of a lubricating oil additive and a blended lubricating oil composition containing such additives is the compatibility of the oil composition with the rubber or elastomer seals employed in the engine. Nitrogen-containing succinimide dispersants employed in crankcase lubricating oil compositions typically have the effect of seriously degrading the rubber seals in internal combustion engines. In particular, such dispersants are known to attack Viton ® AK-6 rubber seals. This deterioration exhibits itself by sharply degrading the flexibility of the seals and increasing their hardness. This is such a critical problem that Volkswagen Corporation requires that all crankcase lubricating oils must pass a Viton ® Seal Compatibility Test before the oil composition will be rated acceptable for engine crankcase service. The polymeric dispersants of the present invention exhibit improved Viton ® seal compatibility over prior art additives. (Viton ® is the trademark for a series of fluoroelastomers based on copolymers of vinylidene fluoride and hexafluoropropylene, produced by DuPont de Nemours, E. I. & Co of Wilmington, Del.).

It is an object of this invention to provide an improved antioxidant-dispersant lubricating oil additive.

Another object is to provide a novel lubricating oil composition which does not degrade elastomer seals in internal combustion engines.

A still further object is to provide a lubricating oil composition which can withstand the stresses imposed by modern internal combustion engines.

Other objects and advantages of the present invention will be apparent to those skilled in the art from a perusal of the following disclosure, including the appended claims.

DISCLOSURE STATEMENT

U.S. Patent Nos. 3,172,892 and 4,048,080 disclose alkenylsuccinimides formed from the reaction of an alkenylsuccinic anhydride and an alkylene polyamine and their use as dispersants in a lubricating oil composition.

U.S. Pat. No. 2,568,976 discloses reaction products prepared by reacting a monocarboxylic acid with a polyalkylene polyamine followed by a reaction of the intermediate product with an alkenyl succinic anhydride.

U.S. Pat. No. 3,216,936 discloses a process for preparing an aliphatic amine lubricant additive which involves reacting an alkylene amine, a polymer substituted succinic acid an an aliphatic monocarboxylic acid.

U.S. Pat. No. 3,131,150 discloses lubricating oil compositions containing dispersant-detergent mono-and di-alkuylsuccinimides or bis(alkenylsuccinimides).

Netherlands Pat. No. 7,509,289 discloses the reaction product of an alkenylsuccinic anhydride and an aminoalcohol namely, a tris(hydroxymethyl)-aminomethane.

U.S. Pat. No. 4,496,746 discloses a composition containing an unsaturated dicarboxylic acid anhydride such as maleic anhydride. It also discloses that use of dispersion of a maleic acid anhydride in a process for preparing an alkenyl succinic acid anhydride such as polyisobutenyl succinic acid anhydride (PIBSA).

U.S. Pat. No. 4,579,674 discloses a hydrocarbyl-substituted succinimide dispersant having a secondary hydroxy-substituted diamine or polyamine segment and a lubricating oil composition containing same.

U.S. Pat. No. 4,338,205 discloses alkenyl succinimide and borated alkenyl succinimide dispersants for a lubricating oil with impaired diesel dispersancy in which the dispersant is treated with an oil-soluble strong acid.

The disclosures of U.S. Pat. Nos. 3,172,892, 4,048,080, 4,496,746, and 4,579,674 are incorporated herein by reference.

U.S. Pat. No. 4,663,064 assigned to Texaco, Inc., discloses dibasic lubricating oil additives which provide improved dispersancy and Viton ® seal compatibility. The additives are prepared by coupling partially glycolate succinimides with organic diacids. European Patent Application No. 8720195.1 discloses polyolefin-substituted succinimides as additives for lubricating oils and fuels. U.S. Pat. No. 4,636,322 discloses lubricating oil compositions having improved dispersancy and Viton ® seal compatibility, the dispersant being prepared by coupling partly glycolate succinimides with an aldehyde and a phenol to form what may be described as a Mannich phenol coupled bis-alkenyl-succinimide.

Co-pending U.S. patent application, Ser. No. 07/428,545 discloses polymeric compositions suitable for use as dispersants for lubricating oil and/or additives for fuels for internal combustion engines, particularly compositions which are compatible with synthetic rubbers and other polymeric materials utilized in seals and the like within internal combustion engines.

SUMMARY OF THE INVENTION

The present invention provides a multifunctional additive which improves the anti-oxidancy, dispersancy and Viton ® Seal compatibility of a lubricating oil. The lubricating oil composition comprises a major portion of a lubricating oil and a minor antioxidant-dispersant amount of a reaction product prepared by the process which comprises:
  (a) reacting a polyethylene amine with an alkenyl succinic acid anhydride to form a mono- and/or bis-alkenyl succinimide;
  (b) adding an organic diacid to the mono- and/or bis-alkenyl succinimide, forming a coupled mono- and/or bis-alkenyl succinimide;
  (c) acylating the coupled mono- and/or bis-alkenyl succinimide with an unsaturated fatty acid or ester to form an acylated coupled bisalkenyl succinimide; and
  (d) adding a nitroso-aromatic amine to said acylated coupled mono- and/or bis-alkenyl succinimide to form an enamine diphenylamine acylated coupled mono and/or bis-alkenyl succinimide.

DETAILED DESCRIPTION OF THE INVENTION

The charge polyethylene amine compositions which can be employed in practice of the process of this invention according to certain of its aspects can typically be characterized by the formula:

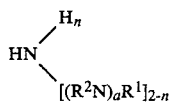

where $R^1$ is H or a hydrocarbon selected from the group consisting of alkyl, alalkyl, cycloalkyl aryl, alkaryl, alkenyl and alkynyl group; $R^2$ is a hydrocarbon selected from the same group as $R^1$ except that $R^2$ contains one less H; a is an interger of about 1 to about 6; and n is 0 or 1.

In the above compound, $R^1$ can be hydrogen or a hydrocarbyl group selected from the group consisting of alkyl, aralkyl, cycloalkyl, aryl, alkaryl, alkenyl, and alkynyl including such radicals when inertly substituted. When $R^1$ is alkyl, it can be methyl, ethyl, n-propyl, iso-propyl, n-butyl, i-butyl, sec-butyl, amyl, octyl, decyl, octadecyl, etc. When $R^1$ is aralkyl, it can be benzyl, betaphenylethyl, etc. When $R^1$ is cycloalkyl, it can be cyclohexyl, cycloheptyl, cyclooctyl, 2-methylcyclo-heptyl, 3-butylcyclohexyl, 3-methylcyclohexyl, etc. When $R^1$ is aryl, it can be tolyl, xylyl, etc. When $R^1$ is alkenyl, it can be vinyl, allyl, 1-butenyl, etc. When $R^1$ is alkynl, it can be ethynyl, propynyl, butynyl, etc. $R^1$ can be inertly substituted i.e., it may bear a non-reactive substituent such as alkyl, aryl, cycloalkyl, ether, halogen, nitro, etc. Typical inert substituent $R^1$ groups include 3-chloropropyl, 2-ethoxyethyl, carboethoxymethyl, 4-methylcyclohexyl, p-chlorophenyl, p-chlorobenzyl, 3-chloro-5-methylphenyl, etc. The preferred $R^1$ groups may be hydrogen or lower alkyl, i.e., $C_2-C_{10}$ alkyl, groups including e.g. methyl, ethyl, n-propyl, i-propyl, butyls, amyls, hexyls, octyls, decyls, etc. $R^1$ may preferably be hydrogen.

And, similarly, $R^2$ can be hydrocarbyl group selected from the same group as $R^1$ subject to the fact that $R^2$ is divalent and contains one less hydrogen. Preferably $R^1$ is hydrogen and $R^2$ is $CH_2CH_2-$, producing a polyethyleneamine. Typical polyamines which can be employed include those listed below in Table I.

TABLE I

Diethylenetriamine (DETA)
Triethylenetetramine (TETA)
Tetraethylenepentamine (TEPA)
Pentaethylenehexamine (PEHA)

In the present lubricating oil composition, at least a portion of the secondary amine groups of the polyalkenylamine moiety in the enamine diphenylamine acylated coupled mono-and/or bis-alkenyl succinimide are reacted with a second carbocylic acid acylating agent selected from the group consisting of hydroxyaliphatic acids which contain from 1 to 4 carbon atoms exclusive of the carbonxyl group. The preferred hydroxyaliphatic acid is glycolic acid.

The acylating reagents useful in this invention comprise members selected from the group consisting of long chain hydrocarbon substituted mono- and dicarboxylic acids or their anhydrides, wherein said long chain hydrocarbon group is a $(C_2-C_{10})$ polymer, e.g., a $(C_2-C_5)$ monoolefin, the polymer having a number average molecular weight of about 500 to about 10,000.

The long chain hydrocarbyl substituted dicarboxylic acid producing material, e.g. acid or anhydride used in the invention includes a long chain hydrocarbon, generally a polyolefin, substituted typically with an average of at least about 0.8 per mole of polyolefin, of an alpha- or beta-unsaturated $(C_4-C_{10})$ dicarboxylic acid, anhydride or ester thereof, such as fumatic acid, itaconic acid, maleic acid, maleic anhydride, chloromaleic acid, dimethyl fumarte, chloromaleic anhydride, acrylic acid, methacrylic acid, crotonic acid, cinnamic acid, adnmixtures thereof.

The dicarboxylic acid, i.e., the diacid, is represented by the following formula

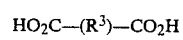

wherein $R^3$ is a hydrocarbyl group selected from the group consisting of a $(C_2-C_{46})$ alkyl, aralkyl, cycloalkyl, aryl, alkaryl, alkenyl and alknyl group.

The enamine diphenylamine acylated coupled bisalkenyl succinimide is represented by the formula

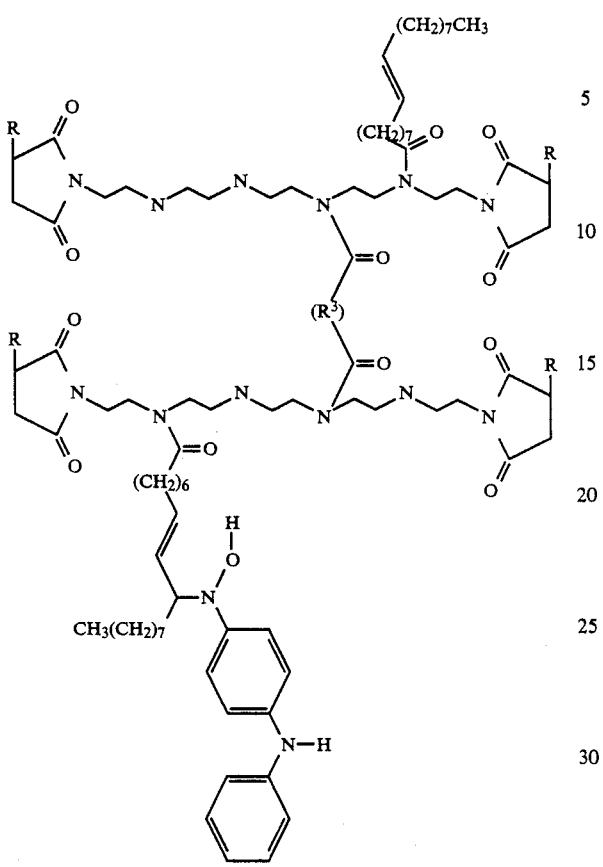

where R is a polyisobutenyl group and $R^3$ is a hydrocarbyl group selected from the group consisting of a ($C_2$-$C_{46}$) alkyl, cycloalkyl, aryl, alkaryl, alkenyl and alkynyl group.

Preferred olefin polymers for reaction with the unsaturated dicarboxylic acid anhydride or ester are polymers comprising a major molar amount of ($C_2$-$C_{10}$), e.g., a ($C_2$-$C_5$), monoolefin. Such olefins include ethylene, propylene, butylene, isobutylene, pentene, octene1 styrene etc. The polymers can be homopolymers such as polyisobutylene, as well as copolymers of two or more of such olefins such as copolymers of: ethylene and propylene, butylene and isobutylene propylene and isobutylene, etc. Other copolymers include those in which a minor molar amount of the copolymer monomers e.g., 1 to 10 mole % is a ($C_4$-$C_{10}$) non-conjugated diolefin, e.g., a copolymer of isobutylene and butadiene; or a copolymer of ethylene, propylene and 1,4-hexadiene; etc.

In some cases, the olefin polymer may be completely saturated, for example an ethylene-propylene copolymer made by a Ziegler-Natta synthesis using hydrogen as a moderator to control molecular weight.

The olefin polymers will usually have number average molecular weights within the range of about 500 to about 10,000, and will therefore usually have an average of from about 50 to 400 carbon atoms. Particularly useful olefin polymers have number average molecular weights within the range of about 800 and about 2500 with approximately one terminal double board per polymer chain. An especially useful starting material for a highly potent dispersant additive made in accordance with this invention is polyisobutylene.

The nitroso-aromatic amine of the present invention is represented by the formula

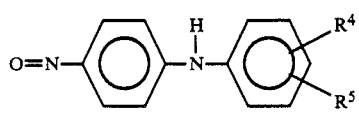

wherein $R^4$ is H, —$NH_2$, —$CH_2$—$(CH_2)_n$—NH—$CH_2$—aryl—$NH_2$ in which n has a value of 1-10, $R^5$ is a ($C_4$-$C_{24}$) alkyl, alkenyl, alkoxyl, aralkyl or alkanyl group.

The nitroso-aromatic amine is the antioxidant group which adds antioxidancy properties to the lubricating oil composition of this invention. The preferred nitroso-aromatic amine is 4-nitrosodiphenylamine.

The nitroso-aromatic amine may also be N-(4-nitrosophenyl) naphthyl amine of the formula

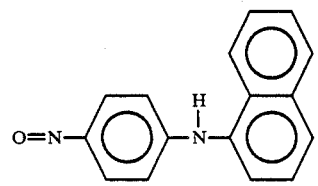

In the present lubricating oil composition, at least a portion of the secondary amine groups of the polyalkenylamine moiety in the enamine diphenylamine acylated coupled mono- and/or bis-alkenyl succinimide may be reacted with a borating agent selected from the group consisting of boric acid, boron oxide, boron halide, and a boron acid ester, to provide a borated derivative thereof.

Instead of a borating agent, a glycolating agent may be added to the enamine diphenylamine acylated coupled mono-and/or bis-alkenyl succinimide to form a glycolated enamine diphenyl-amine acylated coupled mono- and/or bis-alkenyl succinimide.

The preferred glycolating agent is glycolic acid.

EXAMPLES

The following Examples and results thereof are presented to illustrate specific ambodiments of the practice of this invention and the advantages thereof and shold not be interpreted as limitations upon the scope of the invention.

In order to illustrate the effectiveness of the present compounds as antioxidant-dispersants with Viton seal compatibility, there are several tests to which the present succinimides have been subjected. These tests include the Bench oxidation Test (BOT), Engine Test, Sequence VE Test, Viton and Nitrile Butyl Rubber Seal Compatibility Tests, the Daim Benz (DB) Seal Test and the Volkswagen (VW) Seal Viton Compatibility Test. These tests are described below in more detail and the results of the various tests are provided below in Tables I, II, III, IV, V and VI.

EXAMPLE I

Preparation of Diacid Coupled bis-alkenyl Succinimide Antioxidant-Dispersant

A solution of polyisobutenylsuccinic acid anhydride (3262.0 g, 1.0 moles, PIBSA prepared from an approximately 2060 mol. wt. polybutene) in diluent oil (3081.0 g) was charged into a twelve liter 3-neck flask equipped with a mechanical stirrer, thermometer, thermocouple, and nitrogen inlet and heated to 60° C. Next pentaethylenehexamine (145.2 g, 0.55 moles) was added and the heat was increased to 120° C. and maintained for 2.0 hours. Then dioleic acid (154.0 g, 0.132 moles) was added and the temperature maintained at 160° C. for 2.0 hours. Next oleic acid (155.6 g, 0.55 moles) was added and the temperature was maintained at 160° C. for 3 hours to drive off water. Lastly, 4-nitrosodiphenylamine containing 25% water (72.6 g, 0.275 moles,) was added and the temperature maintained at 160° C. for 1 hour. The hot mixture (100° C.) was filtered through diatomaceous earth filter aid. The product (an approximately 50% concentrate) analyzed as follows: % N=0.84 (0.84 calc.), Total Acid Number (TAN)=3.3, and Total Base Number (TBN)=12.7.

EXAMPLE II

Preparation of a Diacid Steoladder bis-alkenyl Succinimide Antioxidant-Disoersant A solution of polyisobutenylsuccinic acid anhydride (3262.0 g, 1.0 moles, PIBSA prepared from an approximately 2060 mol. wt. polybutene) in diluent oil (3342.6 g) was charged into a twelve liter 3-neck flask equipped with a mechanical stirrer, thermometer, thermocouple, and nitrogen inlet and heated to 60° C. Next pentaethylenehexamine (145.2 g, 0.55 moles) was added and the heat was increased to 120° C. and maintained for 2.0 hours. Then dioleic acid (308.0 g, 0.55 moles) was added and the temperature maintained at 160° C. for 2.0 hours. Next oleic acid (283.0 g, 1.0 moles) was added and the temperature was maintained at 160° C. for 3 hours to drive off water. Lastly, 4-nitrosodiphenylamine containing 25% water (72.6 g, 0.275 moles,) was added and the temperature maintained at 160° C. for 1 hour. The hot mixture (100° C.) was filtered through diatomaceous earth filter aid. The product (an approximately 50% concentrate) analyzed as follows: % N=0.065 (0.73 calc.), Total Acid Number (TAN)=6.3, and Total Base Number (TBN)=8.7.

EXAMPLE III

Comparative Example: Preparation of a Diacid Coupled bis-alkenyl Succinimide Dispersant A solution of polyisobutenylsuccinic acid anhydride (3518.0 g, 1.0 moles, PBSA prepared from an approximately 2060 mol. wt. polybutene) in diluent oil (3480.7 g) was charged into a twelve liter 3-neck flask equipped with a mechanical stirrer, thermometer, thermocouple, and nitrogen inlet and heated to 60° C. Next pentaethylenehexamine (145.2 g, 0.55 moles) was added and the heat was increased to 120° C. and maintained for 2.0 hours. Then dioleic acid (b 154.0 g, 0.132 moles) was added and the temperature maintained at 160° C. for 2.0 hours. Next oleic acid (421.6 g, 1.49 moles) was added and the temperature was maintained at 160° C. for 4 hours to drive off water. The hot mixture (100° C.) was filtered through diatomaceous earth filter aid. The product (an approximately 50% concentrate) analyzed as follows: % N=0.66 (0.64 calc.), Total Acid Number (TAN)=7.5, and Total Base Number (TBN)=10.2.

The products of the above Examples were tested and compared by the Bench Oxidation Test outlined below. The results as well as other test results are also provided below in Tables II, III, IV, V and VI.

BENCH OXIDATION TEST AND RESULTS THEREOF

The Bench Oxidation Test (BOT) was used to determine if the dispersants of this invention have anti-oxidant properties. In this test, the oil composition is heated to 175° C. under a blanket of nitrogen. A sample is taken to establish a base line. The oil is maintained at 175° C. while a stream of air is passed through it at the rate of 500 mL/minute for six hours. Samples are taken every hour and the DIR of each sample is determined against the base line 1712 cm-1. The DIR is used as a measure of oxidation. In these tests, the oil employed was a solvent neutral oil having an SUS viscosity at 100° F. of 130. In the tested oils, the additive was employed at nitrogen concentration of 0.1 weight percent. The examples in Table II below, illustrate the surprising effectiveness of the present lubricant additive when employed in a lubricating oil composition.

TABLE II

Dispersant BOT[2]
Example I 6.6
Example III 23.7
(Comparative)

[2]The higher the number above 7 the more pro-oxidant character. The lower the number below 7 the more anti-oxidant character.

The Engine and Sequence VE tests and results thereof are provided below, respectively, in Tables III and IV.

Engine Test Results

The ASTM Sequence VE test is used to evaluate the performance of gasoline engine oils in protecting engine parts from sludge and varnish deposits and valve train wear due to low temperature "stop and go" operation. The test uses a Ford 2.3 L four-cylinder Ranger truck engine. The engine is cycled through three test stages, requiring four hours to complete, for 288 hours or 72 cycles. The Sequence VE engine test results shown in Table 2 were run in a 30W single grade formulation.

The MWM-B engine test used to evaluate the performance of diesel engine oils. The test uses a one (1) cylinder engine that runs for 50 hours. The piston is rated for cleanliness utilizing a merit system. The rating scale goes from 0 to 80, with 80 being a perfectly clean piston.

TABLE III

| | Engine Test Results Diesel Engine Test Results | |
|---|---|---|
| Dispersant[1] | Engine | Result |
| Example I | MWM-B | 74 merits, 21% TGF[1] |
| Example III (Comparative) | MWM-B | 69 merits, 72% TGF[1] |

[1]Top Grove Fill

TABLE IV

| | Sequence VE Gasoline Engine Test Results | | | | |
|---|---|---|---|---|---|
| Dispersant[1] | AS[2] | AV | PVS | % ORC | % OSC |
| Example I | 9.0 | 4.7 | 7.1 | 19.0 | 0.0 |
| LIMITS | 9.0 min | 5.0 min | 6.5 min | 15.0 max | 20.0 |

[1]Dispersant 6.5 wt. % in SAE 30W formulation.

The Viton and Nitrile Butyl Rubber Seal Compatibility Test are provided below as well as the respective results thereof in Tables V and VI.

Viton and Nitrile Butyl Rubber Seal Compatibility Tests

The first test is designed to test the VW Viton seal compatibility for a crankcase lubricating oil composition containing a nitrogen-containing dispersant. The Viton AK-6 seal is soaked at 150° C. for 96 hours in the oil being tested. The elastomer to oil ratio is 1/80. Then the sample is tested for percent change in elongation, percent change in tensile strength, and the degree of cracking. The dispersant is in the oil formulation at 6 weight percent. The results are below in Table V.

TABLE V

| VW Seal Test Result (AK-6) | | |
| --- | --- | --- |
| | EXAMPLE II | LIMITS |
| % Change in Tensile Strength | −14.1 | +/−20 max |
| % Change in Elongation | −23.0 | +/−25 max |
| Cracks at 120% Elongation | none | none |

The second test is designed to test Daimler Benz Nitrile Butyl Rubber seal compatibility for a crankcase lubricating oil composition containing a nitrogen-containing dispersant. The Nitrile Butyl Rubber NBR-34 seal is soaked at 100° C. for 168 hours in the oil being tested. The elastomer to oil ratio is 1/80. Then the sample is tested for percent change in elongation and percent change in tensile strength. The dispersant is in the oil formulation at 6 weight percent. The results are provided below in Table VI.

| DB Seal Test Result (NBR-34) | | |
| --- | --- | --- |
| | EXAMPLE II | LIMITS |
| % Change in Tensile Strength | −13.0 | +/−20 max |
| % Change in Elongation | −30.0 | +/−35 max |

We claim:

1. A lubricating oil composition comprising a major portion of a lubricating oil and a minor antioxidant-dispersant amount of a reaction product prepared by the process which comprises:
   (a) reacting a polyethylene amine with an alkenyl succinic acid anhydride to form a mono- and/or bis-alkenyl succinimide;
   (b) adding an organic diacid to the mono- and/or bis-alkenyl succinimide, forming a coupled mono- and/or bis-alkenyl succinimide;
   (c) acylating the coupled mono- and/or bis-alkenyl succinimide with an unsaturated fatty acid or ester to form an acylated coupled mono- and/or bis-alkenyl succinimide; and
   (d) adding a nitroso-aromatic amine to said acylated coupled mono- and/or bis-alkenyl succinimide to form an enamine diphenylamine acylated coupled mono- and/or bis-alkenyl succinimide.

2. The lubricating composition of claim 1, wherein triethylenetetramine is the polyethylene amine and about 0.5–1.0 moles of an unsaturated acid are added per mole of said triethylenetetramine.

3. The lubricating composition of claim 1, wherein tetraethylenepentamine is the polyethylene amine and about 0.5 to 2.0 moles of an unsaturated fatty acid are added per mole of said tetraethylenepentamine.

4. The lubricating composition of claim 1, wherein pentaethylenehexamine is the polyethylene amine and about 0.5–3.0 moles of an unsaturated fatty acid are added per mole of said pentaethylenehexamine.

5. The lubricating oil composition of claim 1, wherein the mole ratio of said alkenyl succinic acid anhydride to said polyethylene amine is about 0.4 to 0.6.

6. The lubricating oil composition of claim 1, wherein said polyethylene amine is represented by the formula $$HN \begin{matrix} H_n \\ [(R^2N)_aR^1]_{2-n} \end{matrix}$$

where $R^1$ is H or a hydrocarbon selected from the group consisting of alkyl, alalkyl, cycloalkyl aryl, alkaryl, alkenyl and alkynyl group; $R^2$ is a hydrocarbon selected from the same group as $R^1$ except that $R^2$ contains one less H; a is an interger of about 1 to about 6; and n is 0 or 1.

7. The lubricating oil composition of claim 6, wherein said amine is selected from the group consisting of diethylenetriamine, triethylenetetramine, tetraethylenepentamine and pentaethylenehexamine.

8. The lubricating oil composition of claim 7, wherein the mole ratio of said triethylenetetramine to said diacid is about 0.5 to about 0.75.

9. The lubricating oil composition of claim 7, wherein the mole ratio of said tetraethylenepentamine to said diacid is about 0.5 to about 1.0.

10. The lubricating oil composition of claim 7, wherein the mole ratio of said pentaethylenehexamine to said diacid is about 0.5 to 0.5.

11. The lubricating oil composition of claim 7, wherein said amine is tetraethylenepentamine.

12. The lubricating oil composition of claim 7, wherein said amine is pentaethylenehexamine.

13. The lubricating oil composition of claim 7, wherein said amine is triethylenetertramine.

14. The lubricating oil composition of claim 1 wherein said unsaturated fatty acid is selected from group consisting of lauroleic, myristoleic, palmitoleic, oleic, linoleic, linolenic, ricinoleic, licanic, eleostearic, eicosenoic, eicosapolyenoic, erucic, docosapolyenoic, tetracosenoic and tetracosapolyenoic.

15. The lubricating oil composition of claim 1 wherein said diacid/dicarboxylic acid is represented by the following formula $$HO_2C-(R^3)-CO_2H$$

wherein $R^3$ is a hydrocarbyl group selected from the group consisting of a ($C_2$–$C_{46}$) alkyl, aralkyl, cycloalkyl, aryl, alkaryl, alkenyl and alkynyl group.

16. The lubricating oil composition of claim 1 wherein the said nitroso aromatic amine is the antioxidant group.

17. The lubricating oil composition of claim 1 wherein said nitroso-aromatic amine is represented by the formula wherein $R^4$ is H, $-NH_2$, $-CH_2-(CH_2)_n-NH$ $CH_2-aryl-NH_2$ in which n has value of 1–10, $R^5$ is a ($C_4$–$C_{24}$) alkyl, alkenyl, alkoxyl, aralkyl or alkanyl group.

18. The lubricating oil composition of claim 1 wherein said nitroso-aromatic amine is N-(4-nitrosophenyl) naphthyl amine of the formula

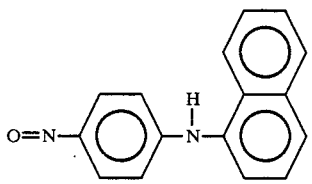

19. The lubricating oil composition of claim 12 wherein said unsaturated fatty acid is oleic acid.

20. The lubricating oil composition of claim 13 wherein said diacid is dioleic.

21. The lubricating oil composition of claim 1 wherein the enamine diphenylamine acylated coupled bis-alkenyl succinimide is represented by the formula

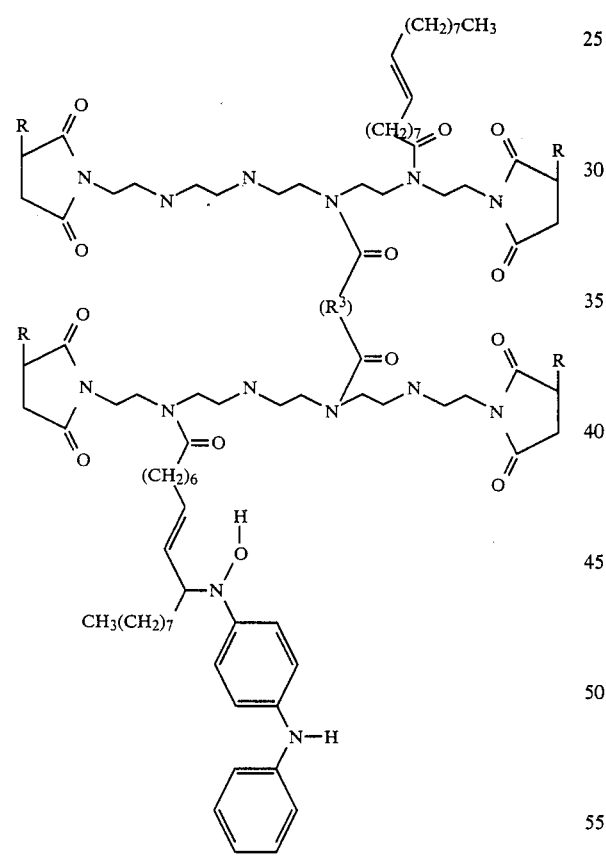

where R is polyisobutenyl group and $R^3$ is a hydrocarbyl group selected from the group consisting of a ($C_2$–$C_{46}$) alkyl, cycloalkyl, aryl, alkaryl, alkenyl and alkynyl group.

22. The lubricating oil composition of claim 14 wherein said antioxidant group is 4-nitrosodiphenylamine.

23. The lubricating oil composition of claim 1 wherein the number average molecular weight of said PIBSA ranges from about 500 to about 10,000.

24. The lubricating oil composition of claim 1 wherein the number average molecular weight of said PIBSA ranges from about 800 to about 2500.

25. The lubricating oil composition of claim 1 wherein at least a portion of the secondary amine groups of the polyalkenylamine moiety in said enamine diphenylamine acylated coupled mono- and/or bis-alkenyl succinimide are reacted with a second carboxylic acid acylating agent selected from the group consisting of hydroxyaliphatic acids.

26. The lubricating oil composition of claim 25 wherein said hydroxyaliphatic acid contains from to 1 to 4 carbon atoms exclusive of the carbonxyl group.

27. The lubricating oil composition of claim 26, wherein said hydroxyaliphatic acid is glycolic acid.

28. A lubricating oil composition comprising a major portion of a lubricating oil and a minor antioxidant—dispersant amount of a reaction product prepared by the process which comprises:
(a) reacting a polyethylene amine with an alkenyl succinic acid anhydride to form a mono- and/or bis-alkenyl succinimide;
(b) adding an organic diacid to the mono- and/or bis-alkenyl succinimide, forming a coupled mono- and/or bis-alkenyl succinimide;
(c) acylating the coupled mono- and/or bis-alkenyl succinimide with an unsaturated fatty acid or ester to form an acylated coupled mono- and/or bis-alkenyl succinimide;
(d) adding a nitroso-aromatic amine to said acylated coupled mono- and/or bis-alkenyl succinimide to form an enamine diphenylamine coupled mono- and/or bis-alkenyl succinimide; and
(e) adding a borating agent to said enamine diphenylamine acylated coupled mono- and/or bis-alkenyl succinimide to form a borated enamine diphenylamine acylated coupled mono- and/or bis-alkenyl succinimide.

29. The lubricating oil composition of claim 28 wherein said borating agent is selected from the group consisting of boric acid, boric oxide, boron halide and a boron acid ester.

30. The lubricating oil composition of claim 28 wherein instead of said borating agent, a glycolating agent is added to said enamine diphenylamine acylated coupled mono- and/or bis-alkenyl succinimide to form a glycolated enamine diphenyl-amine acylated coupled mono- and/or bis-alkenyl succinimide.

31. The lubricating oil composition of claim 30 wherein said glycolating agent is glycolic acid.

* * * * *